(12) United States Patent
Cole

(10) Patent No.: US 11,480,811 B2
(45) Date of Patent: Oct. 25, 2022

(54) HEAD-UP DISPLAY

(71) Applicant: Envisics Ltd, Milton Keynes (GB)

(72) Inventor: Alexander Cole, Knowlhill (GB)

(73) Assignee: ENVISICS LTD, Milton Keynes (GB)

( * ) Notice: Subject to any disclaimer, the term of this patent is extended or adjusted under 35 U.S.C. 154(b) by 313 days.

(21) Appl. No.: 16/584,337

(22) Filed: Sep. 26, 2019

(65) Prior Publication Data
US 2020/0103670 A1    Apr. 2, 2020

(30) Foreign Application Priority Data
Sep. 28, 2018    (GB) ..................... 1815823

(51) Int. Cl.
| | |
|---|---|
| *G02B 30/56* | (2020.01) |
| *G09F 19/12* | (2006.01) |
| *G03H 1/22* | (2006.01) |
| *G09F 13/12* | (2006.01) |
| *G02B 27/01* | (2006.01) |
| *G03B 21/28* | (2006.01) |

(52) U.S. Cl.
CPC ......... *G02B 30/56* (2020.01); *G02B 27/0149* (2013.01); *G03B 21/28* (2013.01); *G03H 1/2294* (2013.01); *G09F 13/12* (2013.01); *G09F 19/12* (2013.01)

(58) Field of Classification Search
CPC ...... G02B 30/56; G02B 27/0149; G02B 5/20; G02B 2027/0112; G02B 2027/0118; G02B 27/0103; G02B 27/01; G02B 30/29; G02B 30/28; G03B 21/28; G03H 1/2294; G03H 2001/221; G03H 2223/15; G03H 2223/24; G03H 1/2205; G09F 13/12; G09F 19/12

USPC .......................................... 359/9, 15, 32, 22
See application file for complete search history.

(56) References Cited

U.S. PATENT DOCUMENTS

| | | |
|---|---|---|
| 2013/0265622 A1 | 10/2013 | Christmas et al. |
| 2014/0022526 A1 | 1/2014 | Van Eijk et al. |
| | (Continued) | |

FOREIGN PATENT DOCUMENTS

| | | |
|---|---|---|
| GB | 2496108 A | 5/2013 |
| GB | 2526275 A | 11/2015 |
| | (Continued) | |

OTHER PUBLICATIONS

Search report in UK Patent Application GB1815823.8, dated Mar. 25, 2019.

*Primary Examiner* — Jade R Chwasz
(74) *Attorney, Agent, or Firm* — McDonnell Boehnen Hulbert & Berghoff LLP

(57) ABSTRACT

The disclosure provides in one aspect a head-up display for a vehicle. The head-up display comprises a picture generating unit, an optical system and a light-selective filter. The picture generating unit is arranged to display a picture on a screen. The optical system is arranged to receive light of the picture. The optical system comprises at least one optical element having optical power arranged to form a magnified image of the picture. The light-selective filter is transmissive to light of the picture and reflective to other light. The light-selective filter is disposed between the optical system and the screen. The light-selective filter has a first surface arranged to receive light from the optical system and a second surface arranged to receive light of the picture from the screen.

15 Claims, 10 Drawing Sheets

(56) References Cited

U.S. PATENT DOCUMENTS

| | | |
|---|---|---|
| 2014/0253987 A1 | 9/2014 | Christmas |
| 2017/0082855 A1 | 3/2017 | Christmas et al. |
| 2017/0115627 A1 | 4/2017 | Christmas et al. |
| 2017/0363869 A1 | 12/2017 | Christmas et al. |
| 2018/0046138 A1 | 2/2018 | Christmas et al. |
| 2018/0120768 A1 | 5/2018 | Christmas |
| 2018/0188532 A1 | 7/2018 | Christmas et al. |
| 2019/0041641 A1 | 2/2019 | Christmas et al. |
| 2019/0064738 A1 | 2/2019 | Cole et al. |

FOREIGN PATENT DOCUMENTS

| | | | |
|---|---|---|---|
| GB | 2554575 A | 4/2018 | |
| GB | 2567409 A | 4/2019 | |
| GB | 2567410 A | 4/2019 | |
| GB | 2569206 A | 6/2019 | |
| GB | 2569208 A | 6/2019 | |
| JP | 2004085915 A * | 3/2004 | ......... G02B 6/29358 |
| JP | 2015087596 A | 5/2015 | |
| JP | 6108169 B2 * | 4/2017 | |
| JP | 2018116156 A * | 7/2018 | |
| JP | 2018116156 A | 7/2018 | |
| WO | 2018078366 A1 | 5/2018 | |
| WO | 2018100394 A1 | 6/2018 | |
| WO | 2018100397 A1 | 6/2018 | |

* cited by examiner

HEAD-UP DISPLAY

CROSS-REFERENCE TO RELATED APPLICATIONS

This application claims the benefit of priority of United Kingdom Patent Application no. 1815823.8, filed Sep. 28, 2018, which is hereby incorporated herein by reference in its entirety.

FIELD

The present disclosure relates to a display device such as an image projector or, more specifically, a virtual image projector. The present disclosure relates to a head-up display and a method of head-up display. More specifically, the present disclosure relates to a method of improving image quality in a head-up display such as a method of sunlight mitigation in a head-up display.

BACKGROUND AND INTRODUCTION

Light scattered from an object contains both amplitude and phase information. This amplitude and phase information can be captured on, for example, a photosensitive plate by well-known interference techniques to form a holographic recording, or "hologram", comprising interference fringes. The hologram may be reconstructed by illumination with suitable light to form a two-dimensional or three-dimensional holographic reconstruction, or replay image, representative of the original object.

Computer-generated holography may numerically simulate the interference process. A computer-generated hologram may be calculated by a technique based on a mathematical transformation such as a Fresnel or Fourier transform. These types of holograms may be referred to as Fresnel/Fourier transform holograms or simply Fresnel/Fourier holograms. A Fourier hologram may be considered a Fourier domain/plane representation of the object or a frequency domain/plane representation of the object. A computer-generated hologram may also be calculated by coherent ray tracing or a point cloud technique, for example.

A computer-generated hologram may be encoded on a spatial light modulator arranged to modulate the amplitude and/or phase of incident light. Light modulation may be achieved using electrically-addressable liquid crystals, optically-addressable liquid crystals or micro-mirrors, for example.

A spatial light modulator typically comprises a plurality of individually-addressable pixels which may also be referred to as cells or elements. The light modulation scheme may be binary, multilevel or continuous. Alternatively, the device may be continuous (i.e. is not comprised of pixels) and light modulation may therefore be continuous across the device. The spatial light modulator may be reflective meaning that modulated light is output in reflection. The spatial light modulator may equally be transmissive meaning that modulated light is output in transmission.

A holographic projector may be provided using the system described herein. Such projectors have found application in head-up displays, "HUD", and head-mounted displays, "HMD", including near-eye devices, for example.

A head-up display usually comprises an optical system having optical power arranged to form a virtual image of a picture in front of the viewer. The picture may be formed by a picture generating unit on a display surface which may comprise plastic. The optical system may comprise one or more optical components such as lens and mirrors having optical power to magnify the image of the picture. Sunlight may damage components of the optical system or picture generating unit particularly when components have optical power to magnify the picture. Furthermore, components of the head-up display may reflect sunlight along the optical path of the image into the eyes of the viewer. A sunlight reflection of just a few percent from a surface of the head-up display can dazzle a driver. The effect is sometimes referred to as veiling glare.

The present disclosure addresses the problem of sunlight reflections from the display surface of the picture generating unit. The present disclosure addresses this problem in a so-called on-axis configuration which is a configuration in which the display surface is perpendicular to the optical axis (i.e. not tilted).

SUMMARY

Aspects of the present disclosure are defined in the appended independent claims.

There is provided a head-up display for a vehicle. The head-up display comprises a picture generating unit, an optical system and a bandpass filter. The picture generating unit is arranged to display a picture. The picture generating unit comprises a spatial light modulator. The spatial light modulator is arranged to spatially modulate light in accordance with a computer-generated hologram displayed thereon to form a holographic reconstruction on a screen. The holographic reconstruction corresponds to the picture. The optical system is arranged to receive light of the picture. The optical system comprises at least one reflective element. The reflective element has optical power. The reflective element is arranged to form a magnified image of the picture. The bandpass filter is transmissive to light of the picture and reflective to light of other wavelengths. The bandpass filter is disposed between the optical system and the screen. The bandpass filter is curved having a convex surface and a concave surface. The convex surface is arranged to receive light, such as sunlight, from the optical system. The concave surface is arranged to receive light of the picture from the screen.

There is also provided a method of improving image quality in a head-up display. A first step of the method comprises displaying a computer-generated hologram on a spatial light modulator. A second step of the method comprises spatially-modulating light in accordance with the computer-generated hologram to form a holographic reconstruction corresponding to the picture on a screen. A third step of the method comprises transmitting light of the picture through a bandpass filter to an optical system. A fourth step of the method comprises forming a magnified image of the picture using at least one reflective element of the optical system having optical power. A fifth step of the method comprises reflecting light of other wavelengths received from the optical system using the bandpass filter. The bandpass filter is curved to form a convex surface receiving light from the optical system and a concave surface receiving light of the picture from the screen.

The bandpass filter protects the picture generating unit from sunlight which may get into the head-up display. This sunlight may be focused towards the picture generating unit by the optical system. Focused sunlight of sufficient power may cause damage to components of the picture generating unit such as the screen. The bandpass filter may be a notched filter comprising transmission bands (or notches) at wavelengths of the light of the picture. The bandpass filter is otherwise reflective to optical wavelengths including infrared, visible and ultra-violet wavelengths. The bandpass filter has a convex side and a concave side. The configuration of the bandpass filter provides two technical improvements. Firstly, the bandpass filter is arranged such that the convex side (or face) receives light, such as the sunlight, from the optical system. The convex side of the bandpass filter therefore disperses (or defocuses) the received sunlight in at least one direction to reduce the risk of damage to other components of the head-up display. Secondly, the bandpass filter is arranged such that the concave side (or face) receives the light of the picture from the screen. The concave side therefore reduces the range of incidence angles thereon which means that a bandpass filter with higher reflectivity to the sunlight may be used. The reflectivity of the bandpass filter may be increased because the width of the transmission bands may be decreased owing to the decreased range of incidence angles. Accordingly, in summary, the bandpass filter is safer and more effective at protecting the picture generating unit from sunlight. The bandpass filter in accordance with this disclosure may be parallel-faced (i.e. the convex side is substantially parallel to the concave side) and easily-formed by, for example, bending around a curved shape such as a cylinder.

The bandpass filter may be cylindrically or conically curved. The bandpass filter may be cylindrically or conically curved around an axis. The axis around which the bandpass filter is curved may be tilted with respect to the screen. The concave surface and the convex surface of the bandpass filter may both be cylindrical or conical. The method of improving image quality in a head-up display may therefore further comprise the sixth step of tilting the axis (about which the bandpass filter is cylindrically or conically curved) with respect to the screen.

The cylindrical curvature on the convex side provides the technical improvement of dispersing or defocusing any sunlight received from the optical system in only one direction. This is advantageous because it means the bandpass filter can be tilted, in the perpendicular direction, such that all sunlight is reflected off-axis. In other words, no sunlight is reflected by the bandpass filter back along the optical axis of the sunlight. The cylindrical surface described may be configured such that no part thereof is perpendicular to the optical axis of the received sunlight. In contrast, a spherically curved surface, for example, cannot be tilted with respect to the screen to reflect all received sunlight away from the optical system because, even if tilted, one point on the spherical surface will always be perpendicular to the optical axis of the received sunlight. Whilst the present disclosure extends to include more complex shapes which avoid this problem, the described cylindrical shape provides the technical improvement of being simple to fabricate.

The light of other wavelengths received by the bandpass filter from the optical system is converging owing to the optical power of the at least one reflective element and the light of the picture transmitted by the bandpass filter is diverging. Therefore, the bandpass filter may have a conical shape with sides that taper inwardly towards the screen. The bandpass filter intercepts a cone of sunlight propagating towards the picture generating unit. The bandpass filter may be tilted with respect to the screen. The sides of the bandpass filter may be tapered inwardly towards the screen in correspondence with the cone of sunlight. This provides the technical improvement of minimising the physical size of the bandpass filter. This may also provide the technical improvement of locally increasing the de-focusing power of the bandpass filter.

It is common to tilt the screen or display surface (i.e. the source image plane) of a picture generating unit to avoid veiling glare (that is, sunlight reflecting off the screen or display surface and reaching the viewer). However, tilting the display surface off-axis is not preferable because it can negatively affect image quality and impose limitations during the design process. There is disclosed herein a configuration which provides the technical improvement of not requiring the screen to be tilted. That is, the normal to the screen may be parallel with the input optical axis of the optical system.

The light received by the bandpass filter from the optical system may be sunlight such as direct sunlight, ambient sunlight or light from any other external source such as a street lamp. The head-up display may further comprise a beam dump arranged to receive light reflected by the convex side of the bandpass filter. The beam dump may be any structure—for example, an absorbing structure—which prevents the sunlight from propagating any further within the head-up display.

The picture generating unit may comprise a laser arranged to emit narrowband light having a centre wavelength corresponding to a transmission band of the bandpass filter. Each light source of the picture generating unit may be a laser such as a laser diode. The picture generating unit may comprise a red, green and blue laser diode respectively arranged to form red, green and blue pictures on the screen. The bandpass filter disclosed herein is particularly suitable for use with a laser light source because the narrow bandwidth of such light sources enables a correspondingly narrowband filter to be used thereby increasing the amount of sunlight reflected away from the picture generating unit. The use of a bandpass filter as disclosed herein is incompatible with picture generating units having a broadband light source such as liquid crystal displays backlit by a white light source.

The optical system comprises at least one reflective element which may be positioned within its focal length of the screen such that the magnified image of the picture is a virtual image. The reflective element has a focal length and the distance between the reflective element and the screen is less than the focal length. It may be said that the reflective element is positioned such that the screen is within its focal distance. The virtual image can be used to augment a real-world scene. The at least one reflective element may be at least one mirror.

A head-up display system comprising the head-up display and an optical combiner may be formed. The optical combiner may be arranged to receive the magnified image of the picture from the head-up display. The optical combiner may reflect the magnified image to a viewing plane. A viewer may position themselves at the viewing plane. The optical combiner may combine the virtual image with a view of a real-world scene. The virtual image of the picture may overlay the view of the real-world scene.

The head-up display may be incorporated into a vehicle having a windscreen. There may therefore be provided a vehicle comprising the head-up display and a windscreen. The windscreen may function as an optical combiner. The windscreen may receive the magnified image of the picture from the head-up display and reflect the magnified image to an eye-box area or volume within the vehicle.

There is further provided a head-up display for a vehicle, wherein the head-up display comprises: a picture generating unit arranged to display a picture, wherein the picture generating unit comprises: a spatial light modulator arranged to spatially-modulate light in accordance with a computer-generated hologram displayed thereon to form a holographic reconstruction corresponding to the picture on a screen; an optical system arranged to receive light of the picture, wherein the optical system comprises at least one optical element having optical power arranged to form a magnified image of the picture; and a light-selective filter, such as a laser-line selective filter, which is transmissive to light of the picture and reflective to other light, wherein the light-selective filter is disposed between the optical system and the screen, and wherein the light-selective filter is curved having a convex surface arranged to receive light from the optical system and a concave surface arranged to receive light of the picture from the screen. The optical element may be a reflective element. The optical element may be a mirror.

There is further provided a head-up display for a vehicle, wherein the head-up display comprises: a picture generating unit arranged to display a picture, wherein the picture generating unit comprises: a spatial light modulator arranged to spatially-modulate light in accordance with a computer-generated hologram displayed thereon to form a holographic reconstruction corresponding to the picture on a screen; an optical system arranged to receive light of the picture, wherein the optical system comprises at least one mirror having optical power arranged to form a magnified image of the picture; and a bandpass filter which is transmissive to light of the picture and reflective to light of other wavelengths, wherein the bandpass filter is disposed between the optical system and the screen and comprises a first surface arranged to receive light from the optical system and a second surface arranged to receive light of the picture from the screen, wherein the first surface is convex.

There is yet further provided a head-up display for a vehicle, wherein the head-up display comprises: a picture generating unit arranged to display a picture, wherein the picture generating unit comprises: a spatial light modulator arranged to spatially-modulate light in accordance with a computer-generated hologram displayed thereon to form a holographic reconstruction corresponding to the picture on a screen; an optical system arranged to receive light of the picture, wherein the optical system comprises at least one mirror having optical power arranged to form a magnified image of the picture; and a bandpass filter which is transmissive to light of the picture and reflective to light of other wavelengths, wherein the bandpass filter is disposed between the optical system and the screen and a first surface arranged to receive light from the optical system and a second surface arranged to receive light of the picture from the screen, wherein the second surface is concave.

There is therefore yet further provided a head-up display for a vehicle, wherein the head-up display comprises: a picture generating unit arranged to display a picture on a display surface using a narrowband light; an optical system arranged to receive light of the picture, wherein the optical system comprises at least one reflective element (e.g. mirror) having optical power arranged to form a magnified image of the picture; and a bandpass filter which is transmissive to light of the picture and reflective to light of other wavelengths, wherein the bandpass filter is disposed between the optical system and the screen and comprises a first surface arranged to receive light from the optical system, wherein the first surface has negative optic power arranged to disperse the light received from the optical system in one direction. Optionally, the picture generating unit may comprise a spatial light modulator arranged to spatially-modulate light in accordance with a computer-generated hologram displayed thereon to form a holographic reconstruction corresponding to the picture on the display surface. Optionally, the bandpass filter may further comprise a second surface arranged to receive light of the picture from the display surface.

The term "hologram" is used to refer to the recording which contains amplitude information or phase information, or some combination thereof, regarding the object. The term "holographic reconstruction" is used to refer to the optical reconstruction of the object which is formed by illuminating the hologram. The system disclosed herein is described as a "holographic projector" because the holographic reconstruction is a real image and spatially-separated from the hologram. The term "replay field" is used to refer to the 2D area within which the holographic reconstruction is formed and fully focused. If the hologram is displayed on a spatial light modulator comprising pixels, the replay field will be repeated in the form of a plurality diffracted orders wherein each diffracted order is a replica of the zeroth-order replay field. The zeroth-order replay field generally corresponds to the preferred or primary replay field because it is the brightest replay field. Unless explicitly stated otherwise, the term "replay field" should be taken as referring to the zeroth-order replay field. The term "replay plane" is used to refer to the plane in space containing all the replay fields. The terms "image", "replay image" and "image region" refer to areas of the replay field illuminated by light of the holographic reconstruction. In some embodiments, the "image" may comprise discrete spots which may be referred to as "image spots" or, for convenience only, "image pixels".

The terms "encoding", "writing" or "addressing" are used to describe the process of providing the plurality of pixels of the SLM with a respective plurality of control values which respectively determine the modulation level of each pixel. It may be said that the pixels of the SLM are configured to "display" a light modulation distribution in response to receiving the plurality of control values. Thus, the SLM may be said to "display" a hologram and the hologram may be considered an array of light modulation values or levels.

It has been found that a holographic reconstruction of acceptable quality can be formed from a "hologram" containing only phase information related to the Fourier transform of the original object. Such a holographic recording may be referred to as a phase-only hologram. Embodiments relate to a phase-only hologram but the present disclosure is equally applicable to amplitude-only holography.

The present disclosure is also equally applicable to forming a holographic reconstruction using amplitude and phase information related to the Fourier transform of the original object. In some embodiments, this is achieved by complex modulation using a so-called fully complex hologram which contains both amplitude and phase information related to the original object. Such a hologram may be referred to as a fully-complex hologram because the value (grey level) assigned to each pixel of the hologram has an amplitude and phase component. The value (grey level) assigned to each pixel may be represented as a complex number having both amplitude and phase components. In some embodiments, a fully-complex computer-generated hologram is calculated.

Reference may be made to the phase value, phase component, phase information or, simply, phase of pixels of the computer-generated hologram or the spatial light modulator as shorthand for "phase-delay". That is, any phase value described is, in fact, a number (e.g. in the range 0 to $2\pi$) which represents the amount of phase retardation provided by that pixel. For example, a pixel of the spatial light modulator described as having a phase value of $\pi/2$ will retard the phase of received light by $\pi/2$ radians. In some embodiments, each pixel of the spatial light modulator is operable in one of a plurality of possible modulation values (e.g. phase delay values). The term "grey level" may be used to refer to the plurality of available modulation levels. For example, the term "grey level" may be used for convenience to refer to the plurality of available phase levels in a phase-only modulator even though different phase levels do not provide different shades of grey. The term "grey level" may also be used for convenience to refer to the plurality of available complex modulation levels in a complex modulator.

The hologram therefore comprises an array of grey levels—that is, an array of light modulation values such as an array of phase-delay values or complex modulation values. The hologram is also considered a diffractive pattern because it is a pattern that causes diffraction when displayed on a spatial light modulator and illuminated with light having a wavelength comparable to, generally less than, the pixel pitch of the spatial light modulator. Reference is made herein to combining the hologram with other diffractive patterns such as diffractive patterns functioning as a lens or grating. For example, a diffractive pattern functioning as a grating may be combined with a hologram to translate the replay field on the replay plane or a diffractive pattern functioning as a lens may be combined with a hologram to focus the holographic reconstruction on a replay plane in the near field.

The term "light of the picture" is used herein to refer to the light which forms the picture and emanates (for example, scatters over a range of angles) from the screen. In other words, the "light of the picture" is the light forming the picture. The "light of the picture" may be received by an optical system such that the optical system may image the picture. The "light of the picture" may be monochromatic or polychromatic. The "light of the picture" may be composite colour. For example, the "light of the picture" may comprise red, green and blue light. The "light of the picture" may be polarised.

Reference is also made to a "light selective filter" such as a "laser-line selective filter". The term "selective filter" is used to indicate a component having a response to light which is dependent on at least one parameter—such as wavelength—characterising the light. In examples, a "selective filter" is reflective to light of most optical wavelengths but transmissive to at least one wavelength or range of wavelengths. The term "laser-line" is used to indicate that, to the person skilled in the art of optics, the range of wavelengths at which the component is transmissive is considered "narrowband". For example, narrowband may comprise a centre wavelength and a full-wave half-maximum of less than 30 nm, optionally less than 15 nm, further optionally less than 5 nm. The person skilled in the art will understand how the bandwidth of a light source may be matched to a transmission band of an optical filter such as a bandpass filter.

BRIEF DESCRIPTION OF THE DRAWINGS

Specific embodiments are described by way of example only with reference to the following figures.

The same reference numbers will be used throughout the drawings to refer to the same or like parts.

DETAILED DESCRIPTION OF EMBODIMENTS

The present invention is not restricted to the embodiments described in the following but extends to the full scope of the appended claims. That is, the present invention may be embodied in different forms and should not be construed as limited to the described embodiments, which are set out for the purpose of illustration. Although different embodiments and groups of embodiments may be disclosed separately in the detailed description which follows, any feature of any embodiment or group of embodiments may be combined with any other feature or combination of features of any embodiment or group of embodiments. That is, all possible combinations and permutations of features disclosed in the present disclosure are envisaged.

In describing a time relationship—for example, when the temporal order of events is described as "after", "subsequent", "next", "before" or suchlike—the present disclosure should be taken to include continuous and non-continuous events unless otherwise specified. For example, the description should be taken to include a case which is not continuous unless wording such as "just", "immediate" or "direct" is used.

Although the terms "first", "second", etc. may be used herein to describe various elements, these elements are not to be limited by these terms. These terms are only used to distinguish one element from another. For example, a first element could be termed a second element, and, similarly, a second element could be termed a first element, without departing from the scope of the appended claims.

Features of different embodiments may be partially or overall coupled to or combined with each other, and may be variously inter-operated with each other. Some embodiments may be carried out independently from each other, or may be carried out together in co-dependent relationship.

Optical Configuration

Figure 1:
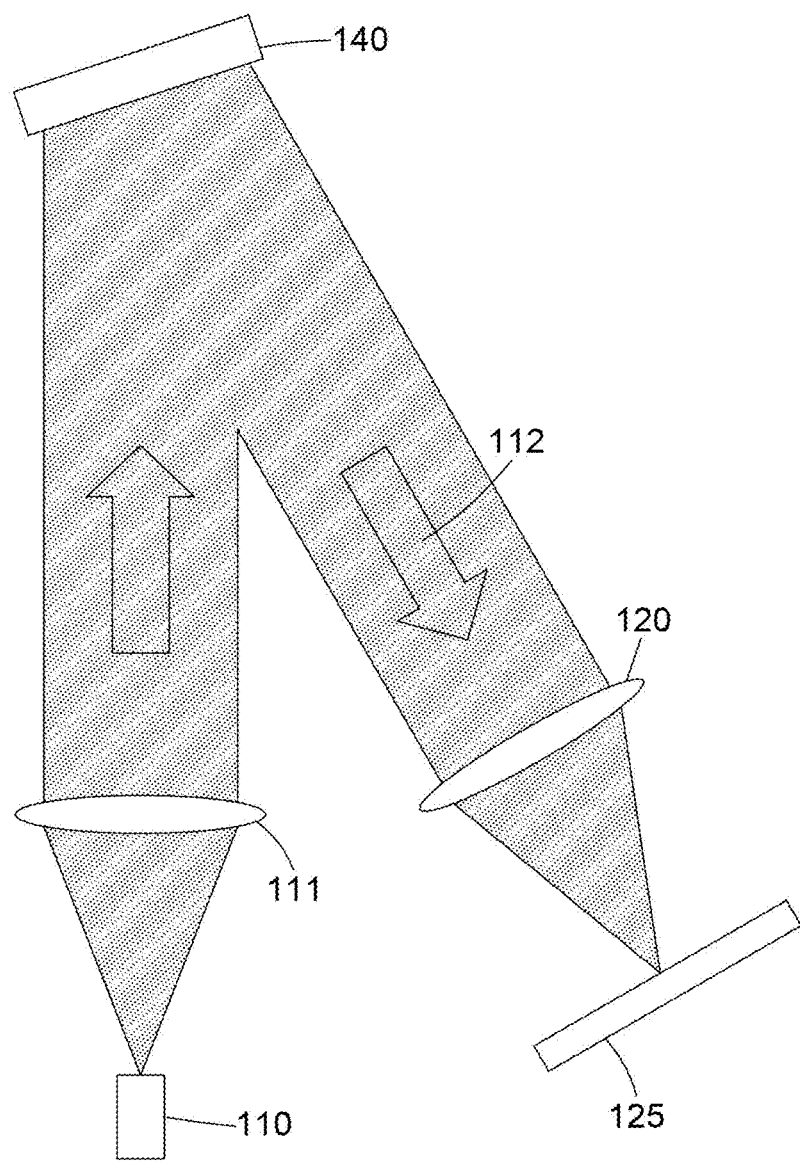
FIG. 1 is a schematic showing a reflective SLM producing a holographic reconstruction on a screen.

FIG. 1 shows an embodiment in which a computer-generated hologram is encoded on a single spatial light modulator. The computer-generated hologram is a Fourier transform of the object for reconstruction. It may therefore be said that the hologram is a Fourier domain or frequency domain or spectral domain representation of the object. In this embodiment, the spatial light modulator is a reflective liquid crystal on silicon, "LCOS", device. The hologram is encoded on the spatial light modulator and a holographic reconstruction is formed at a replay field, for example, a light receiving surface such as a screen or diffuser.

A light source 110, for example a laser or laser diode, is disposed to illuminate the SLM 140 via a collimating lens 111. The collimating lens causes a generally planar wavefront of light to be incident on the SLM. In FIG. 1, the direction of the wavefront is off-normal (e.g. two or three degrees away from being truly orthogonal to the plane of the transparent layer). However, in other embodiments, the generally planar wavefront is provided at normal incidence and a beam splitter arrangement is used to separate the input and output optical paths. In the embodiment shown in FIG. 1, the arrangement is such that light from the light source is reflected off a mirrored rear surface of the SLM and interacts with a light-modulating layer to form an exit wavefront 112. The exit wavefront 112 is applied to optics including a Fourier transform lens 120, having its focus at a screen 125. More specifically, the Fourier transform lens 120 receives a beam of modulated light from the SLM 140 and performs a frequency-space transformation to produce a holographic reconstruction at the screen 125.

Notably, in this type of holography, each pixel of the hologram contributes to the whole reconstruction. There is not a one-to-one correlation between specific points (or image pixels) on the replay field and specific light-modulating elements (or hologram pixels). In other words, modulated light exiting the light-modulating layer is distributed across the replay field.

In these embodiments, the position of the holographic reconstruction in space is determined by the dioptric (focusing) power of the Fourier transform lens. In the embodiment shown in FIG. 1, the Fourier transform lens is a physical lens. That is, the Fourier transform lens is an optical Fourier transform lens and the Fourier transform is performed optically. Any lens can act as a Fourier transform lens but the performance of the lens will limit the accuracy of the Fourier transform it performs. The skilled person understands how to use a lens to perform an optical Fourier transform.

Hologram Calculation

In some embodiments, the computer-generated hologram is a Fourier transform hologram, or simply a Fourier hologram or Fourier-based hologram, in which an image is reconstructed in the far field by utilising the Fourier transforming properties of a positive lens. The Fourier hologram is calculated by Fourier transforming the desired light field in the replay plane back to the lens plane. Computer-generated Fourier holograms may be calculated using Fourier transforms.

A Fourier transform hologram may be calculated using an algorithm such as the Gerchberg-Saxton algorithm. Furthermore, the Gerchberg-Saxton algorithm may be used to calculate a hologram in the Fourier domain (i.e. a Fourier transform hologram) from amplitude-only information in the spatial domain (such as a photograph). The phase information related to the object is effectively "retrieved" from the amplitude-only information in the spatial domain. In some embodiments, a computer-generated hologram is calculated from amplitude-only information using the Gerchberg-Saxton algorithm or a variation thereof.

The Gerchberg Saxton algorithm considers the situation when intensity cross-sections of a light beam, $I_A(x, y)$ and $I_B(x, y)$, in the planes A and B respectively, are known and $I_A(x, y)$ and $I_B(x, y)$ are related by a single Fourier transform. With the given intensity cross-sections, an approximation to the phase distribution in the planes A and B, $\psi_A(x, y)$ and $\psi_B(x, y)$ respectively, is found. The Gerchberg-Saxton algorithm finds solutions to this problem by following an iterative process. More specifically, the Gerchberg-Saxton algorithm iteratively applies spatial and spectral constraints while repeatedly transferring a data set (amplitude and phase), representative of $I_A(x, y)$ and $I_B(x, y)$, between the spatial domain and the Fourier (spectral or frequency) domain. The corresponding computer-generated hologram in the spectral domain is obtained through at least one iteration of the algorithm. The algorithm is convergent and arranged to produce a hologram representing an input image. The hologram may be an amplitude-only hologram, a phase-only hologram or a fully complex hologram.

In some embodiments, a phase-only hologram is calculated using an algorithm based on the Gerchberg-Saxton algorithm such as described in British patent 2,498,170 or 2,501,112 which are hereby incorporated in their entirety by reference. However, embodiments disclosed herein describe calculating a phase-only hologram by way of example only. In these embodiments, the Gerchberg-Saxton algorithm retrieves the phase information $\psi[u, v]$ of the Fourier transform of the data set which gives rise to a known amplitude information $T[x, y]$, wherein the amplitude information $T[x, y]$ is representative of a target image (e.g. a photograph). Since the magnitude and phase are intrinsically combined in the Fourier transform, the transformed magnitude and phase contain useful information about the accuracy of the calculated data set. Thus, the algorithm may be used iteratively with feedback on both the amplitude and the phase information. However, in these embodiments, only the phase information $\psi[u, v]$ is used as the hologram to form a holographic representative of the target image at an image plane. The hologram is a data set (e.g. 2D array) of phase values.

In other embodiments, an algorithm based on the Gerchberg-Saxton algorithm is used to calculate a fully-complex hologram. A fully-complex hologram is a hologram having a magnitude component and a phase component. The hologram is a data set (e.g. 2D array) comprising an array of complex data values wherein each complex data value comprises a magnitude component and a phase component.

In some embodiments, the algorithm processes complex data and the Fourier transforms are complex Fourier transforms. Complex data may be considered as comprising (i) a real component and an imaginary component or (ii) a magnitude component and a phase component. In some embodiments, the two components of the complex data are processed differently at various stages of the algorithm.

Figure 2A:
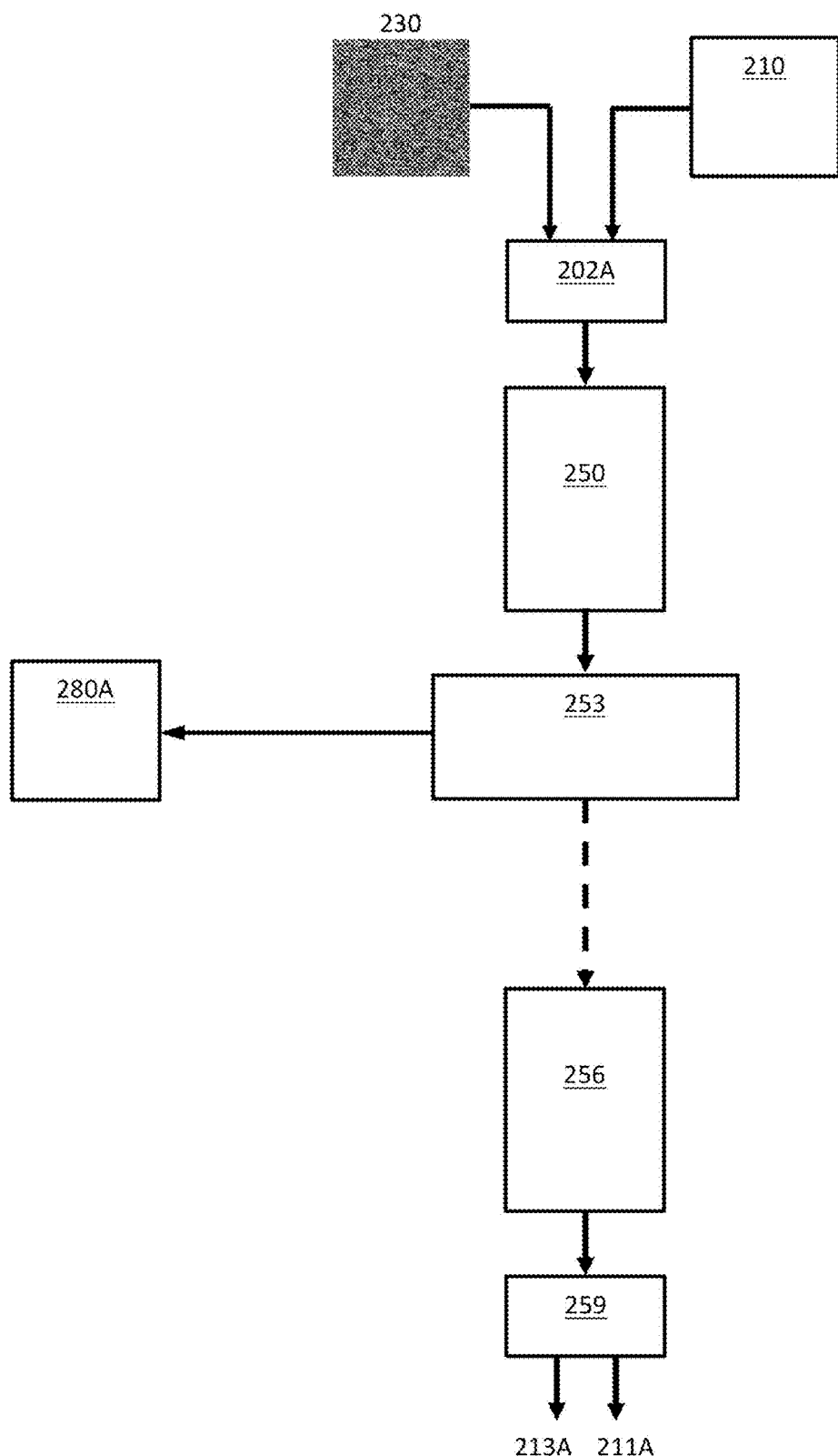
FIG. 2A illustrates a first iteration of an example Gerchberg-Saxton type algorithm.

FIG. 2A illustrates the first iteration of an algorithm in accordance with some embodiments for calculating a phase-only hologram. The input to the algorithm is an input image 210 comprising a 2D array of pixels or data values, wherein each pixel or data value is a magnitude, or amplitude, value. That is, each pixel or data value of the input image 210 does not have a phase component. The input image 210 may therefore be considered a magnitude-only or amplitude-only or intensity-only distribution. An example of such an input image 210 is a photograph or one frame of video comprising a temporal sequence of frames. The first iteration of the algorithm starts with a data forming step 202A comprising assigning a random phase value to each pixel of the input image, using a random phase distribution (or random phase seed) 230, to form a starting complex data set wherein each data element of the set comprising magnitude and phase. It may be said that the starting complex data set is representative of the input image in the spatial domain.

First processing block 250 receives the starting complex data set and performs a complex Fourier transform to form a Fourier transformed complex data set. Second processing block 253 receives the Fourier transformed complex data set and outputs a hologram 280A. In some embodiments, the hologram 280A is a phase-only hologram. In these embodiments, second processing block 253 quantiles each phase value and sets each amplitude value to unity in order to form hologram 280A. Each phase value is quantised in accordance with the phase-levels which may be represented on the pixels of the spatial light modulator which will be used to "display" the phase-only hologram. For example, if each pixel of the spatial light modulator provides 256 different phase levels, each phase value of the hologram is quantised into one phase level of the 256 possible phase levels. Hologram 280A is a phase-only Fourier hologram which is representative of an input image. In other embodiments, the hologram 280A is a fully complex hologram comprising an array of complex data values (each including an amplitude component and a phase component) derived from the received Fourier transformed complex data set. In some embodiments, second processing block 253 constrains each complex data value to one of a plurality of allowable complex modulation levels to form hologram 280A. The step of constraining may include setting each complex data value to the nearest allowable complex modulation level in the complex plane. It may be said that hologram 280A is representative of the input image in the spectral or Fourier or frequency domain. In some embodiments, the algorithm stops at this point.

However, in other embodiments, the algorithm continues as represented by the dotted arrow in FIG. 2A. In other words, the steps which follow the dotted arrow in FIG. 2A are optional (i.e. not essential to all embodiments).

Third processing block 256 receives the modified complex data set from the second processing block 253 and performs an inverse Fourier transform to form an inverse Fourier transformed complex data set. It may be said that the inverse Fourier transformed complex data set is representative of the input image in the spatial domain.

Fourth processing block 259 receives the inverse Fourier transformed complex data set and extracts the distribution of magnitude values 211A and the distribution of phase values 213A. Optionally, the fourth processing block 259 assesses the distribution of magnitude values 211A. Specifically, the fourth processing block 259 may compare the distribution of magnitude values 211A of the inverse Fourier transformed complex data set with the input image 510 which is itself, of course, a distribution of magnitude values. If the difference between the distribution of magnitude values 211A and the input image 210 is sufficiently small, the fourth processing block 259 may determine that the hologram 280A is acceptable. That is, if the difference between the distribution of magnitude values 211A and the input image 210 is sufficiently small, the fourth processing block 259 may determine that the hologram 280A is a sufficiently-accurate representative of the input image 210. In some embodiments, the distribution of phase values 213A of the inverse Fourier transformed complex data set is ignored for the purpose of the comparison. It will be appreciated that any number of different methods for comparing the distribution of magnitude values 211A and the input image 210 may be employed and the present disclosure is not limited to any particular method. In some embodiments, a mean square difference is calculated and if the mean square difference is less than a threshold value, the hologram 280A is deemed acceptable. If the fourth processing block 259 determines that the hologram 280A is not acceptable, a further iteration of the algorithm may be performed. However, this comparison step is not essential and in other embodiments, the number of iterations of the algorithm performed is predetermined or preset or user-defined.

Figure 2B:
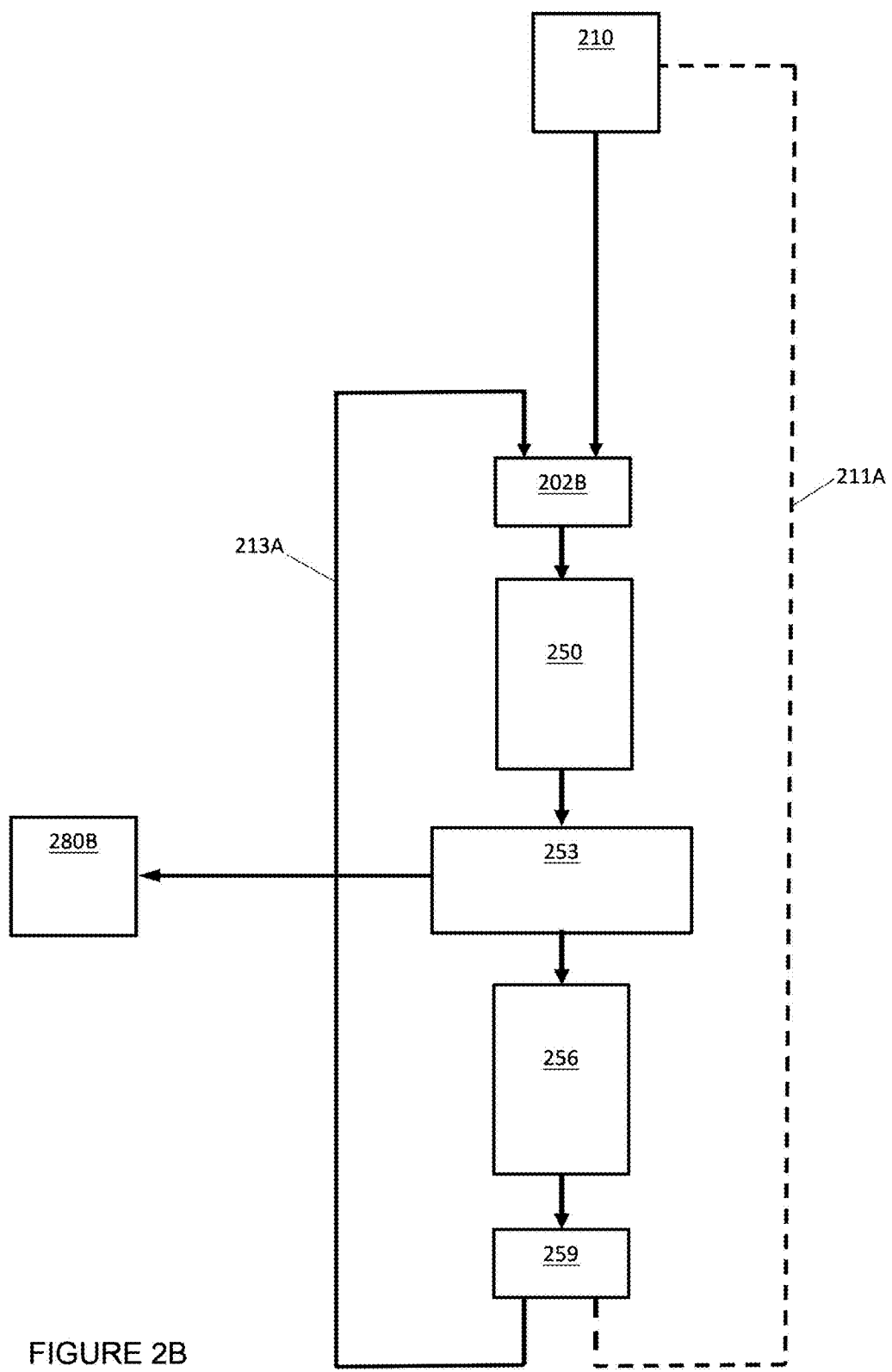
FIG. 2B illustrates the second and subsequent iterations of the example Gerchberg-Saxton type algorithm.

FIG. 2B represents a second iteration of the algorithm and any further iterations of the algorithm. The distribution of phase values 213A of the preceding iteration is fed-back through the processing blocks of the algorithm. The distribution of magnitude values 211A is rejected in favour of the distribution of magnitude values of the input image 210. In the first iteration, the data forming step 202A formed the first complex data set by combining distribution of magnitude values of the input image 210 with a random phase distribution 230. However, in the second and subsequent iterations, the data forming step 202B comprises forming a complex data set by combining (i) the distribution of phase values 213A from the previous iteration of the algorithm with (ii) the distribution of magnitude values of the input image 210.

The complex data set formed by the data forming step 202B of FIG. 2B is then processed in the same way described with reference to FIG. 2A to form second iteration hologram 280B. The explanation of the process is not therefore repeated here. The algorithm may stop when the second iteration hologram 280B has been calculated. However, any number of further iterations of the algorithm may be performed. It will be understood that the third processing block 256 is only required if the fourth processing block 259 is required or a further iteration is required. The output hologram 280B generally gets better with each iteration. However, in practice, a point is usually reached at which no measurable improvement is observed or the positive benefit of performing a further iteration is out-weighted by the negative effect of additional processing time. Hence, the algorithm is described as iterative and convergent.

Figure 2C:
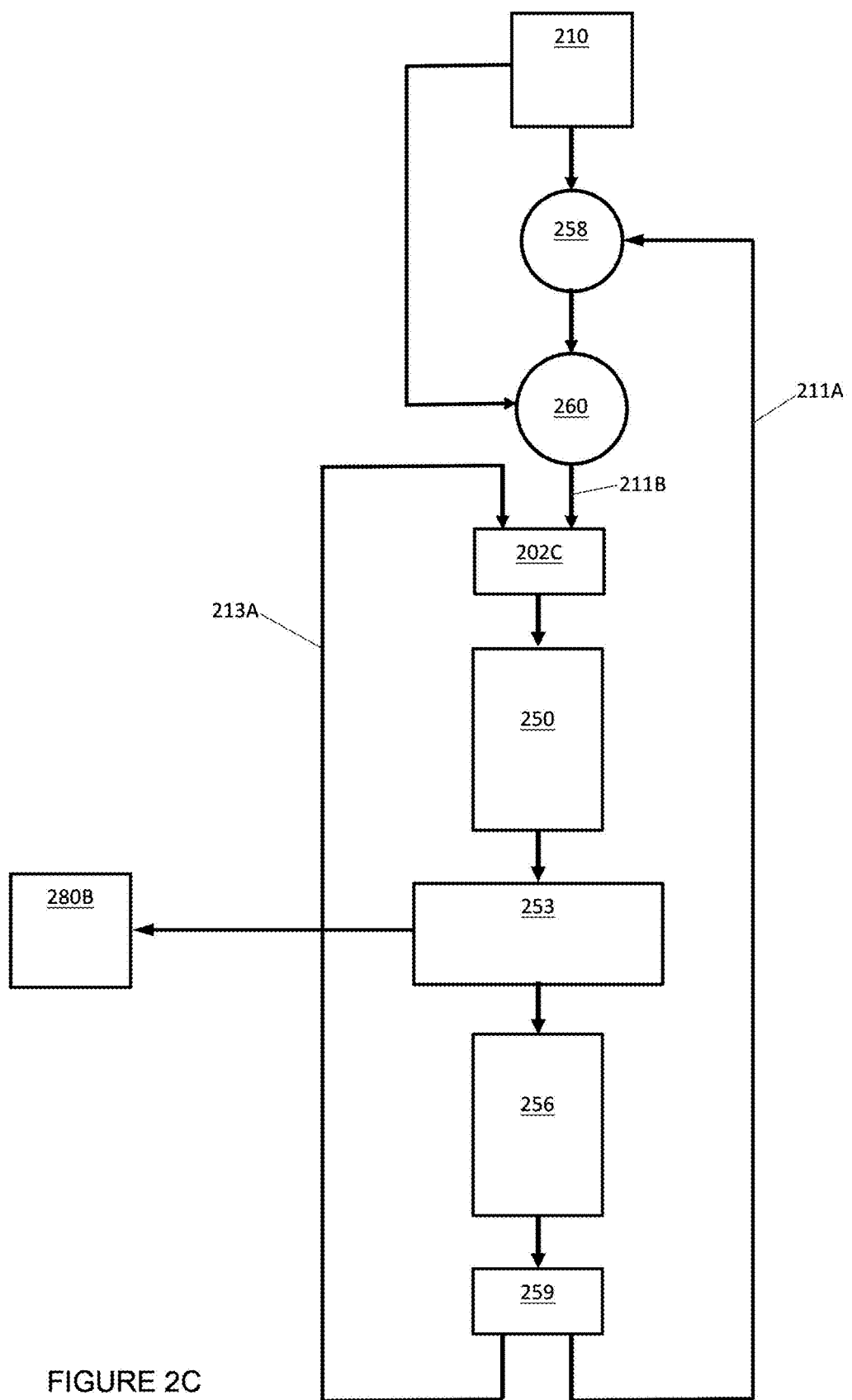
FIG. 2C illustrates alternative second and subsequent iterations of the example Gerchberg-Saxton type algorithm.

FIG. 2C represents an alternative embodiment of the second and subsequent iterations. The distribution of phase values 213A of the preceding iteration is fed-back through the processing blocks of the algorithm. The distribution of magnitude values 211A is rejected in favour of an alternative distribution of magnitude values. In this alternative embodiment, the alternative distribution of magnitude values is derived from the distribution of magnitude values 211 of the previous iteration. Specifically, processing block 258 subtracts the distribution of magnitude values of the input image 210 from the distribution of magnitude values 211 of the previous iteration, scales that difference by a gain factor α and subtracts the scaled difference from the input image 210. This is expressed mathematically by the following equations, wherein the subscript text and numbers indicate the iteration number:

$$R_{n+1}[x,y]=F'\{\exp(i\psi_n[u,v])\}$$

$$\psi_n[u,v]=\angle F\{\eta \cdot \exp(i\angle R_n[x,y])\}$$

$$\eta=T[x,y]-\alpha(|R_n[x,y]|-T[x,y])$$

where:
F' is the inverse Fourier transform;
F is the forward Fourier transform;
R[x, y] is the complex data set output by the third processing block 256;
T[x, y] is the input or target image;
∠ is the phase component;
ψ is the phase-only hologram 280B;
η is the new distribution of magnitude values 211B; and
α is the gain factor.

The gain factor α may be fixed or variable. In some embodiments, the gain factor α is determined based on the size and rate of the incoming target image data. In some embodiments, the gain factor α is dependent on the iteration number. In some embodiments, the gain factor α is solely function of the iteration number.

The embodiment of FIG. 2C is the same as that of FIG. 2A and FIG. 2B in all other respects. It may be said that the phase-only hologram ψ(u, v) comprises a phase distribution in the frequency or Fourier domain.

In some embodiments, the Fourier transform is performed using the spatial light modulator. Specifically, the hologram data is combined with second data providing optical power. That is, the data written to the spatial light modulation comprises hologram data representing the object and lens data representative of a lens. When displayed on a spatial light modulator and illuminated with light, the lens data emulates a physical lens—that is, it brings light to a focus in the same way as the corresponding physical optic. The lens data therefore provides optical, or focusing, power. In these embodiments, the physical Fourier transform lens 120 of FIG. 1 may be omitted. It is known in the field of computer-generated holography how to calculate data representative of a lens. The data representative of a lens may be referred to as a software lens. For example, a phase-only lens may be formed by calculating the phase delay caused by each point of the lens owing to its refractive index and spatially-variant optical path length. For example, the optical path length at the centre of a convex lens is greater than the optical path length at the edges of the lens. An amplitude-only lens may be formed by a Fresnel zone plate. It is also known in the art of computer-generated holography how to combine data representative of a lens with a hologram so that a Fourier transform of the hologram can be performed without the need for a physical Fourier lens. In some embodiments, lensing data is combined with the hologram by simple addition such as simple vector addition. In some embodiments, a physical lens is used in conjunction with a software lens to perform the Fourier transform. Alternatively, in other embodiments, the Fourier transform lens is omitted altogether such that the holographic reconstruction takes place in the far-field. In further embodiments, the hologram may be combined in the same way with grating data—that is, data arranged to perform the function of a grating such as beam steering. Again, it is known in the field of computer-generated holography how to calculate such data. For example, a phase-only grating may be formed by modelling the phase delay caused by each point on the surface of a blazed grating. An amplitude-only grating may be simply superimposed with an amplitude-only hologram to provide angular steering of the holographic reconstruction.

In some embodiments, the Fourier transform is performed jointly by a physical Fourier transform lens and a software lens. That is, some optical power which contributes to the Fourier transform is provided by a software lens and the rest of the optical power which contributes to the Fourier transform is provided by a physical optic or optics.

In some embodiments, there is provided a real-time engine arranged to receive image data and calculate holograms in real-time using the algorithm. In some embodiments, the image data is a video comprising a sequence of image frames. In other embodiments, the holograms are pre-calculated, stored in computer memory and recalled as needed for display on a SLM. That is, in some embodiments, there is provided a repository of predetermined holograms.

Embodiments relate to Fourier holography and Gerchberg-Saxton type algorithms by way of example only. The present disclosure is equally applicable to Fresnel holography and holograms calculated by other techniques such as those based on point cloud methods.

Light Modulation

A spatial light modulator may be used to display the diffractive pattern including the computer-generated hologram. If the hologram is a phase-only hologram, a spatial light modulator which modulates phase is required. If the hologram is a fully-complex hologram, a spatial light modulator which modulates phase and amplitude may be used or a first spatial light modulator which modulates phase and a second spatial light modulator which modulates amplitude may be used.

In some embodiments, the light-modulating elements (i.e. the pixels) of the spatial light modulator are cells containing liquid crystal. That is, in some embodiments, the spatial light modulator is a liquid crystal device in which the optically-active component is the liquid crystal. Each liquid crystal cell is configured to selectively-provide a plurality of light modulation levels. That is, each liquid crystal cell is configured at any one time to operate at one light modulation level selected from a plurality of possible light modulation levels. Each liquid crystal cell is dynamically-reconfigurable to a different light modulation level from the plurality of light modulation levels. In some embodiments, the spatial light modulator is a reflective liquid crystal on silicon (LCOS) spatial light modulator but the present disclosure is not restricted to this type of spatial light modulator.

A LCOS device provides a dense array of light modulating elements, or pixels, within a small aperture (e.g. a few centimetres in width). The pixels are typically approximately 10 microns or less which results in a diffraction angle of a few degrees meaning that the optical system can be compact. It is easier to adequately illuminate the small aperture of a LCOS SLM than it is the larger aperture of other liquid crystal devices. An LCOS device is typically reflective which means that the circuitry which drives the pixels of a LCOS SLM can be buried under the reflective surface. The results in a higher aperture ratio. In other words, the pixels are closely packed meaning there is very little dead space between the pixels. This is advantageous because it reduces the optical noise in the replay field. A LCOS SLM uses a silicon backplane which has the advantage that the pixels are optically flat. This is particularly important for a phase modulating device.

Figure 3:
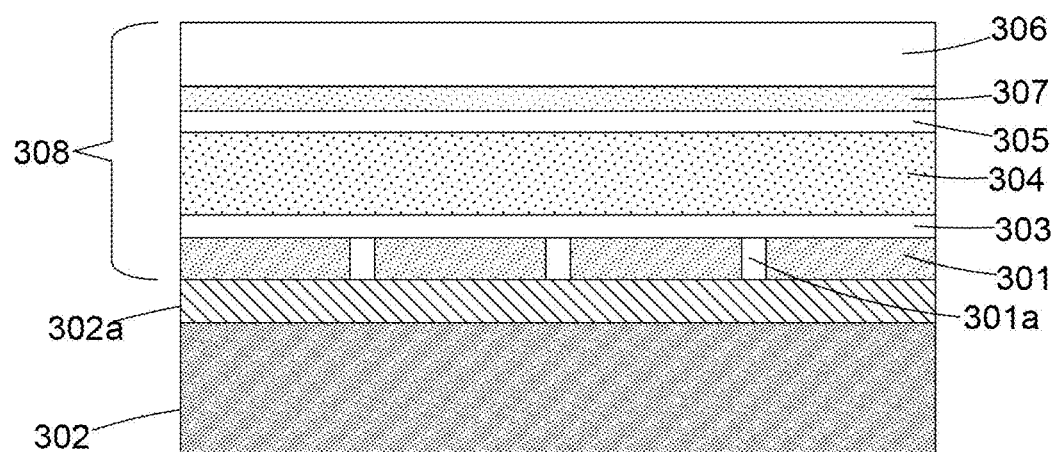
FIG. 3 is a schematic of a reflective LCOS SLM.

A suitable LCOS SLM is described below, by way of example only, with reference to FIG. 3. An LCOS device is formed using a single crystal silicon substrate 302. It has a 2D array of square planar aluminium electrodes 301, spaced apart by a gap 301*a*, arranged on the upper surface of the substrate. Each of the electrodes 301 can be addressed via circuitry 302*a* buried in the substrate 302. Each of the electrodes forms a respective planar mirror. An alignment layer 303 is disposed on the array of electrodes, and a liquid crystal layer 304 is disposed on the alignment layer 303. A second alignment layer 305 is disposed on the planar transparent layer 306, e.g. of glass. A single transparent electrode 307 e.g. of ITO is disposed between the transparent layer 306 and the second alignment layer 305.

Each of the square electrodes 301 defines, together with the overlying region of the transparent electrode 307 and the intervening liquid crystal material, a controllable phase-modulating element 308, often referred to as a pixel. The effective pixel area, or fill factor, is the percentage of the total pixel which is optically active, taking into account the space between pixels 301*a*. By control of the voltage applied to each electrode 301 with respect to the transparent electrode 307, the properties of the liquid crystal material of the respective phase modulating element may be varied, thereby to provide a variable delay to light incident thereon. The effect is to provide phase-only modulation to the wavefront, i.e. no amplitude effect occurs.

The described LCOS SLM outputs spatially modulated light in reflection. Reflective LCOS SLMs have the advantage that the signal lines, gate lines and transistors are below the mirrored surface, which results in high fill factors (typically greater than 90%) and high resolutions. Another advantage of using a reflective LCOS spatial light modulator is that the liquid crystal layer can be half the thickness than would be necessary if a transmissive device were used. This greatly improves the switching speed of the liquid crystal (a key advantage for the projection of moving video images). However, the teachings of the present disclosure may equally be implemented using a transmissive LCOS SLM.

Head-Up Display

Figure 4:
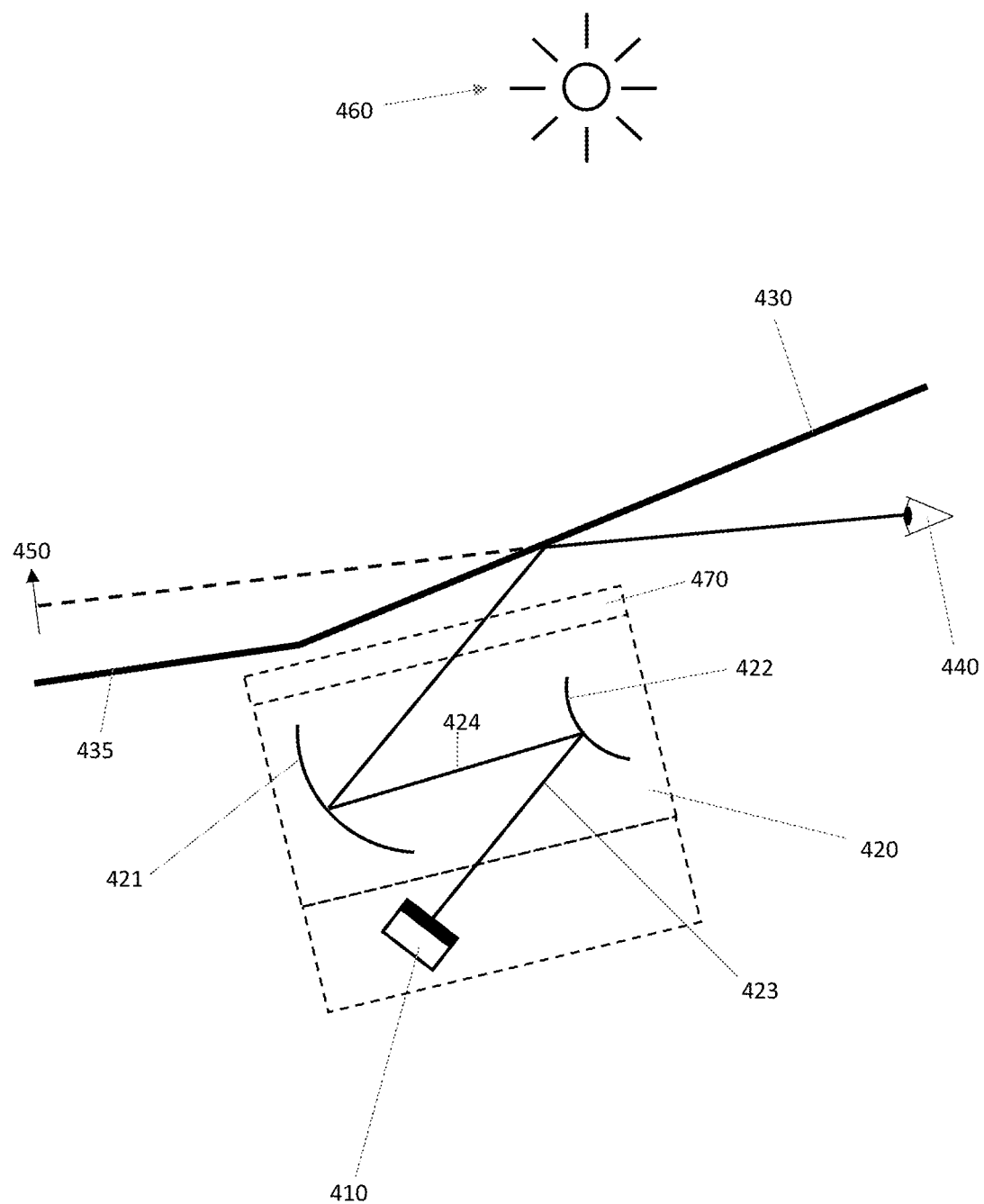
FIG. 4 is a schematic cross-sectional view of a typical head-up display.

FIG. 4 shows a HUD in a vehicle such as a car. The windscreen 430 and bonnet (or hood) 435 of the vehicle are shown in FIG. 4. The HUD comprises a picture generating unit, "PGU", 410 and an optical system 420. The optical system 420 shown in FIG. 4 comprises two mirrors by way of example only. The present disclosure is equally applicable to optical systems comprising any number of mirrors including just one mirror. In other embodiments described herein, the second mirror 422 is omitted.

The PGU 410 comprises a light source, a screen (or light receiving surface) and a processor (or computer) arranged to computer-control the image content of the picture. The PGU 410 is arranged to generate a picture, or sequence of pictures, on the screen. The screen may be a diffuser such as a moving diffuser. In some embodiments, the screen is plastic (that is, made of plastic).

In summary, the optical system 420 forms a magnified virtual image of each picture for the viewer and, optionally, corrects for image distortion caused by the windscreen. In more detail, the optical system 420 comprises an input port, an output port, a first mirror 421 and a second mirror 422. The first mirror 421 and second mirror 422 are arranged to guide light from the input port of the optical system to the output port of the optical system. More specifically, the second mirror 422 is arranged to receive light of the picture from the PGU 410 and the first mirror 421 is arranged to receive light of the picture from the second mirror 422. The first mirror 421 is further arranged to reflect the received light of the picture to the output port. The optical path from the input port to the output port therefore comprises a first optical path 423 (or first optical path component) from the input to the second mirror 422 and a second optical path 424 (or second optical path component) from the second mirror 422 to the first mirror 421. There is, of course, a third optical path (or optical path component) from the first mirror to the output port but that is not assigned a reference numeral in FIG. 4. The optical configuration shown in FIG. 4 may be referred to as a "z-fold" configuration owing to the shape of the optical path. The HUD is configured and positioned within the vehicle such that light of the picture from the output port of the optical system 420 is incident upon the windscreen 430 and at least partially reflected by the windscreen 430 to the user 440 of the HUD.

The picture formed on the light receiving surface of the PGU 410 may only be a few centimetres in width and height. The optical system 420 therefore provides magnification. More specifically, the optical system 420 forms a magnified image of the picture for the viewer. In embodiments, the image produced by the optical system 420 is a virtual image. In some embodiments, the first mirror 421 provides all the optical power (that is, dioptric or focusing power) and the screen is positioned within the front focal distance of the first mirror 421. That is, the distance from the first mirror 421 to the screen of the picture generating unit 410 is less than the focal length of the first mirror 421. In some embodiments, the second mirror 422 also has optical power and the screen is positioned within the front focal distance of the combined magnification system formed by the first mirror 421 and second mirror 422. The first mirror 421 and/or second mirror 422 may also correct for optical distortions such as those caused by the windscreen 430 which typically has a complex curved shape. In some embodiments, the first mirror and second mirror are arranged to fold the optical path from the input to the output in order to increase the optical path length (of "throw") without overly increasing the physical size of the HUD.

The user 440 of the HUD (for example, the driver of the car) sees a virtual image 450 of the picture in the windscreen 430. Accordingly, in embodiments, the optical system is arranged to form a virtual image of each picture on a windscreen of the vehicle. The virtual image 450 is formed a distance down the bonnet 435 of the car. For example, the virtual image may be 1 to 2.5 metres from the user 440. The output port of the optical system 420 is aligned with an aperture in the dashboard of the car such that light of the picture is directed by the optical system 420 and windscreen 430 to the user 440. In this configuration, the windscreen 430 functions as an optical combiner. In some embodiments, the optical system is arranged to form a virtual image of each picture on an additional optical combiner which is included in the system. The windscreen 430, or additional optical combiner if included, combines light from the real-world scene with light of the picture. It may therefore be understood that the HUD may provide augmented reality including a virtual image of the picture. For example, the augmented reality information may include navigation information or information related to the speed of the automotive vehicle. In some embodiments, the light forming the picture is output by incident upon the windscreen at Brewster's angle (also known as the polarising angle) or within 5 degrees of Brewster's angle such as within 2 degrees of Brewster's angle.

The PGU 410 of the present disclosure comprises a holographic projector and a screen. In accordance with the disclosure above, the holographic projector comprises a light source, a spatial light modulator and a hologram processor. The spatial light modulator is arranged to spatially-modulate light in accordance with holograms represented on the spatial light modulator. The hologram processor is arranged to provide the computer-generated holograms. In some embodiments, the hologram processor selects a computer-generated hologram for output from a repository (e.g. memory) comprising a plurality of computer-generated holograms. In other embodiments, the hologram processor calculates and outputs the computer-generated holograms in real-time. In some embodiments, each picture formed by the PGU 410 is a holographic reconstruction on the screen. That is, in some embodiments, each picture is formed by interference of the spatially-modulated light on the screen.

The dashboard of the vehicle comprises an aperture because the HUD requires an optical path (preferably, an unobstructed optical path) to the windscreen. However, this optical path between the windscreen and HUD equally allows sunlight, such as ambient sunlight and direct sunlight, to get into the HUD. This causes various problems some of which are addressed by the present disclosure. The present disclosure is concerned with sunlight which travels along the optical axis of the head-up display toward the picture generating unit 410. Such sunlight is particularly problematic because the optical power of the optical system 420 causes this sunlight to be focused towards the picture generating unit 410 where it can damage components or degrade image quality.

Bandpass Filter

In embodiments, a bandpass filter is included between the screen of the picture generating unit 410 and the optical system 420. In the configurations described with reference to FIGS. 5 to 8, the second mirror 422 of the optical system 420 is omitted and the first mirror 421 receives light of the picture directly from the screen. Embodiments described a first mirror 421 as an example of a reflective element. In other embodiments, the optical system is a waveguide and an inner surface of the waveguide may be arranged to provide the optical power. That is, the reflective element is an inner surface of the waveguide. The bandpass filter is transmissive to light of the picture and reflective to other light, such as light of other optical wavelengths. More specifically, the bandpass filter is generally reflective to optical wavelengths but has transmission notches at the wavelengths of the light of the picture. Each transmission notch is a band of wavelengths at which the filter is transmissive rather than reflective. Each transmission notch is considered narrow because each light source of the picture generating unit is a narrowband light source such as a laser. Again, reference is made herein to a mirror by way of example only. The mirror may be any optical element having optical power as described.

Figure 5A:
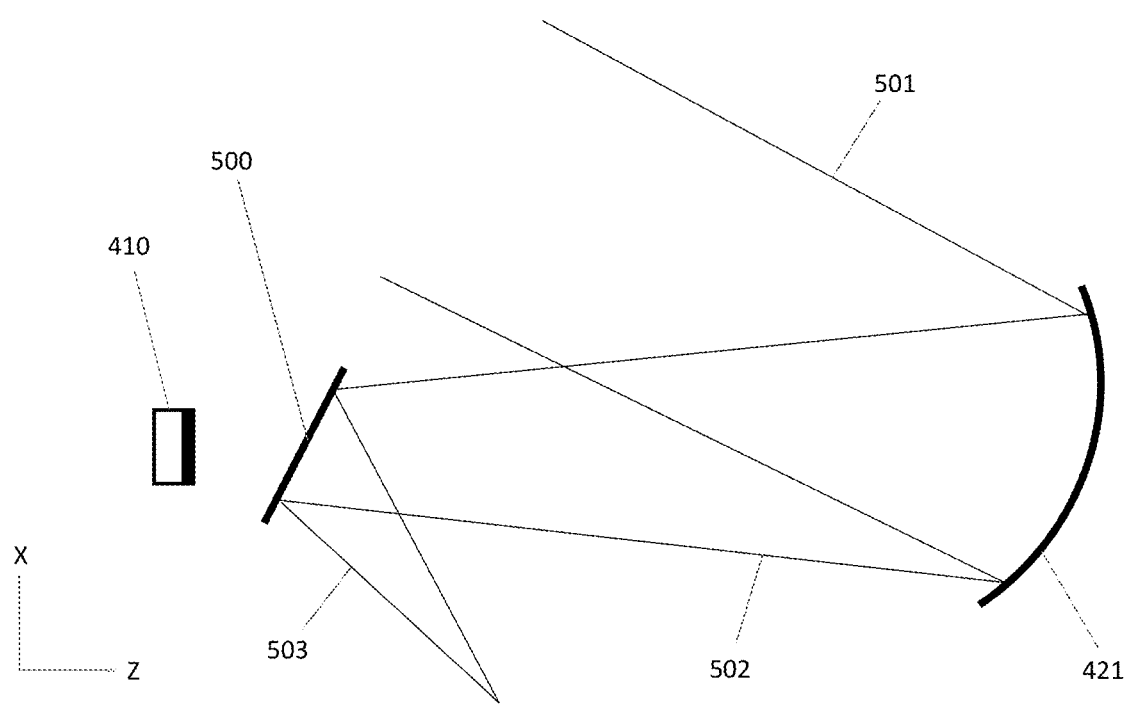
FIG. 5A is a schematic cross-sectional view and FIG. 5B is a schematic plan view of a first example in accordance with the present disclosure.
Figure 5B:
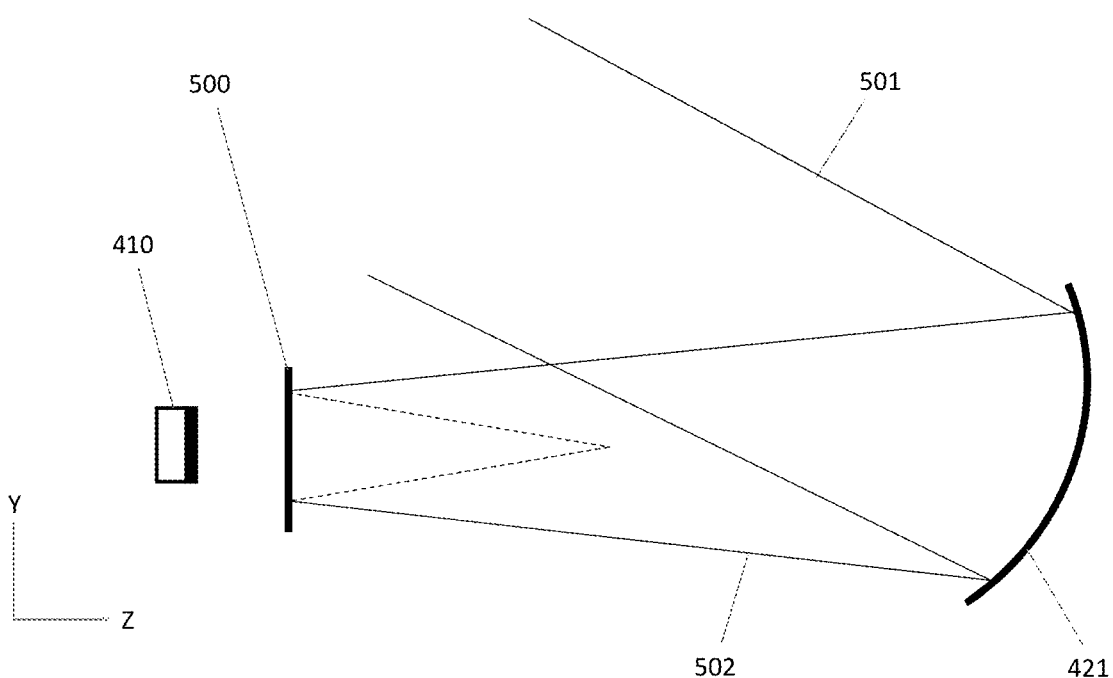

In summary, FIGS. 5A and 5B show a first example in which the bandpass filter is flat (i.e. substantially planar) and tilted with respect to the screen of the picture generating unit 410. FIG. 5A shows the picture generating unit 410, comprising a screen represented by the thick line, arranged to display a picture. A first mirror 421 having optical power is arranged to receive light of the picture and relay the light of the picture. The bandpass filter 500 is disposed between the picture generating unit 410 and first mirror 421. More specifically, the bandpass filter 500 is disposed between the screen and first mirror 421. The z-axis is the optical axis on which the picture generating unit 410, bandpass filter 600 and first mirror 421 are disposed. The screen is planar and disposed on an x-y plane. The optical system is arranged to receive light on-axis from the picture generating unit. That is, the screen is normal to the optical axis on which the picture generating unit 410, bandpass filter 600 and first mirror 421 are disposed. The bandpass filter is tilted with respect to the x-axis. More specifically, as shown in FIG. 5A, the cross-section of the bandpass filter on the x-z plane is straight and tilted with respect to the x-axis. As shown in FIG. 5B, the cross-section of the bandpass filter on the y-z plane is straight and parallel to the screen.

In operation, the first mirror 421 receives sunlight. For example, the first mirror 421 receives sunlight through the aperture in the dashboard of the vehicle. The first mirror 421 has optical power to magnify the picture displayed on the screen. Therefore, in reverse, the first mirror 421 focuses sunlight towards the picture generating unit. The sunlight follows a first optical path 501 to the first mirror 421. The sunlight on the first optical path 501 may be substantially collimated. The sunlight is focused towards the picture generating unit 410 along a second optical path 502 from the first mirror 421 to the bandpass filter 500. The bandpass filter 500 is generally reflective to the sunlight including infrared, visible and ultra-violet wavelengths. Owing to the tilt of the bandpass filter 500, the reflected sunlight is directed off-axis along a third optical path 503. The bandpass filter 500 does not therefore reflect the sunlight back to the first mirror 421. In other words, the sunlight reflected by the bandpass filter 500 is not returned to the first mirror 421. The bandpass filter 500 is tilted such that non-normal incidence thereon is provided. That is, the sunlight on the second optical path 502 is incident on the bandpass filter 500 at an angle greater than zero. The third optical path 503 is not parallel to the second optical path 502. The sunlight received by the bandpass filter 500 is directed out of the system. For example, the sunlight may be "dumped" out of the system. The picture generating unit 410 is protected/shielded from the focused sunlight by the bandpass filter. Furthermore, the tilt of the bandpass filter 500 ensures that the reflected sunlight does not reach the driver. The tilt therefore ensures that the bandpass filter 500 does not cause veiling glare.

Figure 6A:
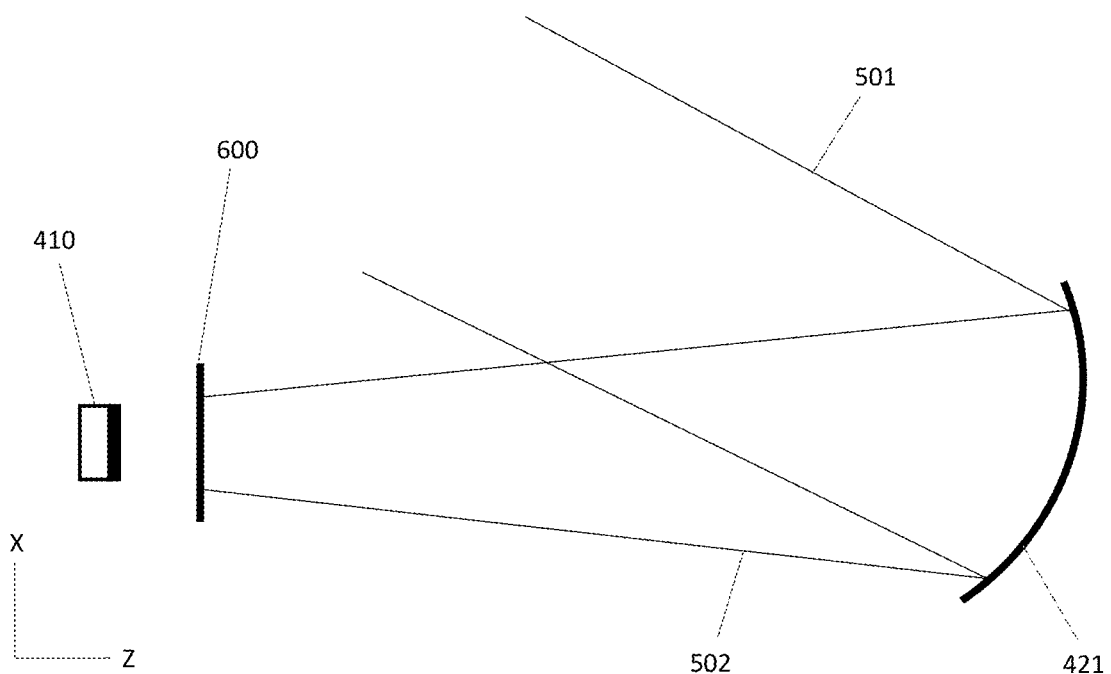
FIG. 6A is a schematic cross-sectional view and FIG. 6B is a schematic plan view of a second example in accordance with the present disclosure.
Figure 6B:
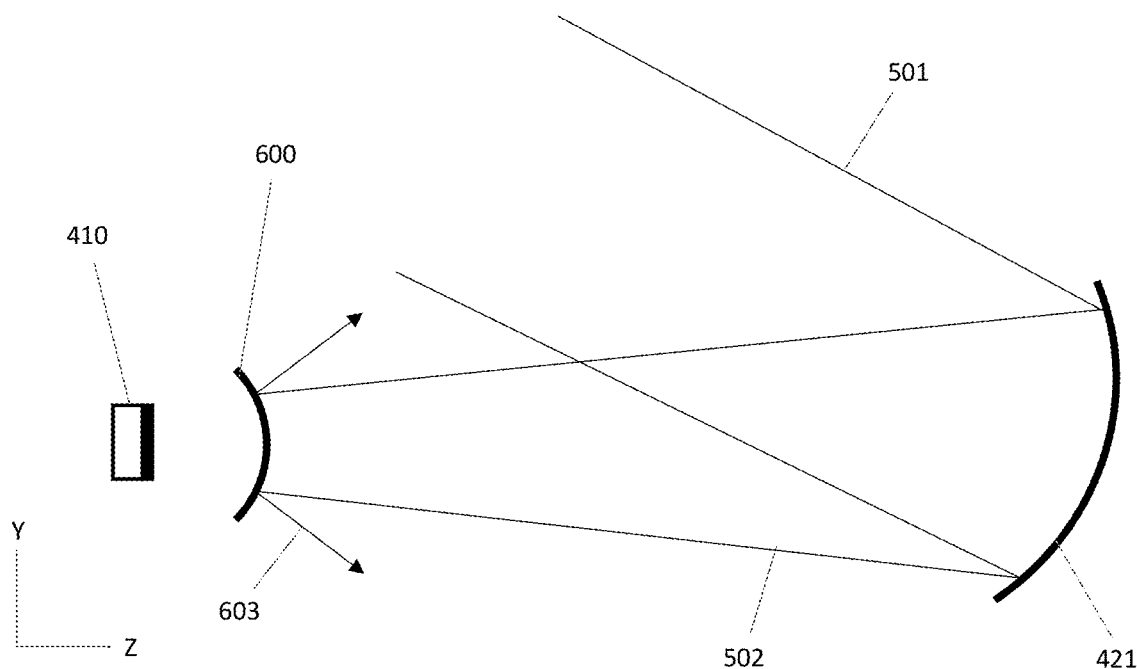

In summary, FIGS. 6A and 6B show a second example in which the bandpass filter 600 is curved around an axis which is parallel to the screen. In this example, the bandpass filter 600 is cylindrically curved around in the x-axis, wherein the screen is disposed on an x-y plane and the z-axis is the optical axis on which the picture generating unit 410, bandpass filter 600 and first mirror 421 are disposed. The bandpass filter is curved to form a convex surface facing the first mirror 421 and a concave surface facing the screen. The bandpass filter may be curved in any way to form these two surfaces. The first surface is convex and receives light, such as sunlight, from the optical system. The first surface disperses that sunlight in at least one direction as shown by light rays 603 in FIG. 6B. It may be said that the first surface defocuses the sunlight in at least one direction. This reduces the energy density of the sunlight and therefore the risk that the sunlight causes damage after reflection from the bandpass filter 600. The second surface is concave and receives light of the picture from the screen. The second surface receives light of the picture over a range of incidence angles. The concave curvature of the second surface reduces that range of incidence angles compared to a flat bandpass filter. This means that a bandpass filter with narrower transmission notches may be used. This, in turn, means that more unwanted wavelengths can be filtered out by the bandpass filter. In other words, more sunlight can be filtered out.

Figure 7A:
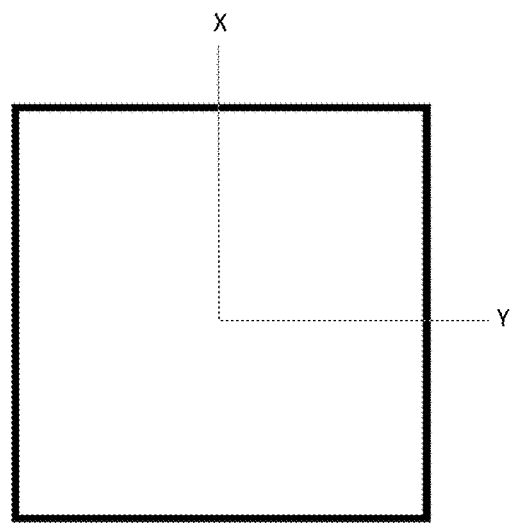
FIGS. 7A, 7B and 7C are schematic views of example light-selective filters in accordance with example.
Figure 7B:
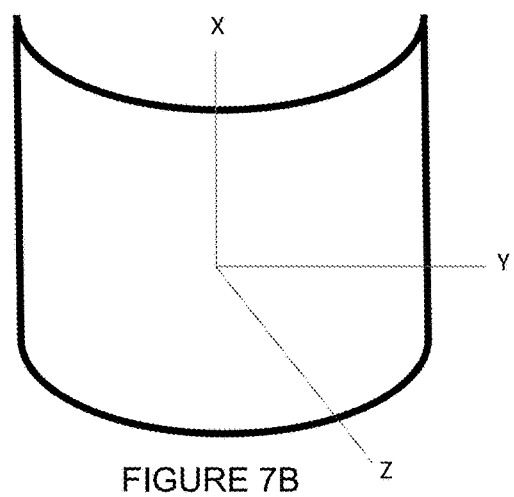
Figure 7C:
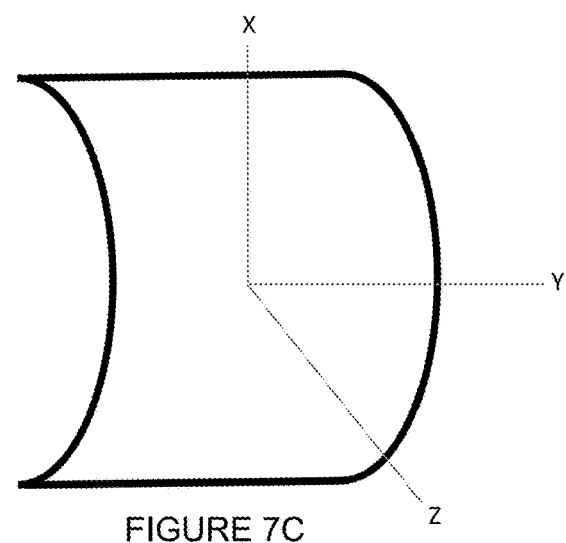

FIG. 7A shows a flat or planar bandpass filter in accordance with the first example. FIGS. 7B and 7C show a cylindrically curved bandpass filter in accordance with the second example. FIG. 7B shows a bandpass filter which is cylindrically curved around the x-axis. FIG. 7C shows a bandpass filter which is cylindrically curved around the y-axis. The bandpass filter may be cylindrically curved around any axis parallel to the plane of the screen. For the avoidance of doubt, it is not essential that the bandpass filter is cylindrically curved and the bandpass filter may be shaped (e.g. curved) in other ways to provide the described light-receiving surfaces.

Figure 8A:
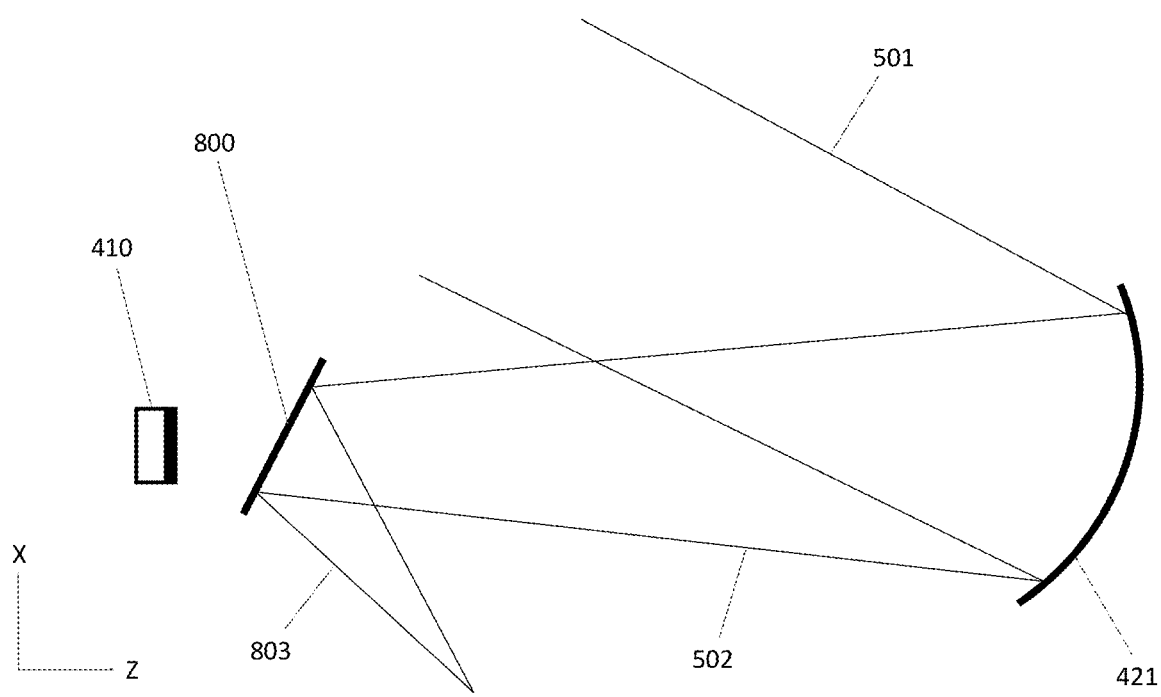
FIG. 8A is a schematic cross-sectional view and FIG. 8B is a schematic plan view of a third example in accordance with the present disclosure.
Figure 8B:
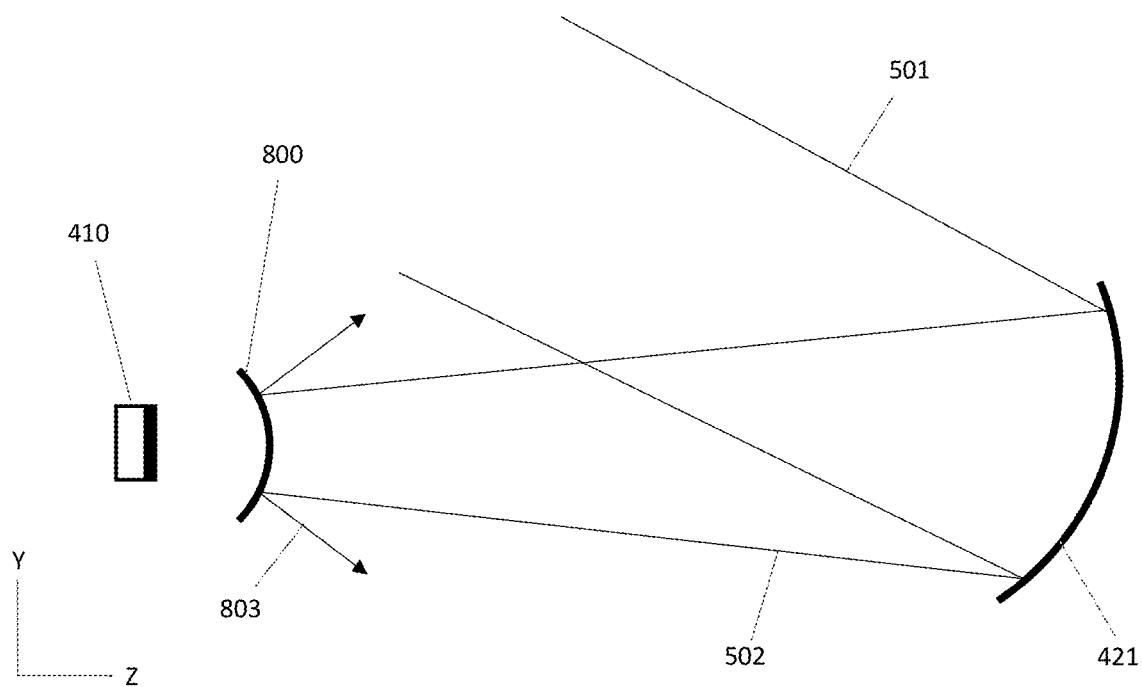

In summary, FIGS. 8A and 8B show a third example in which the bandpass filter 800 is curved around an axis which is tilted with respect to the plane of the screen. The bandpass filter 800 shown in FIGS. 8A and 8B may be formed by curving around an axis parallel to the x-axis and then tilting that axis with respect to the x-axis. Alternatively, the bandpass filter 800 shown in FIGS. 8A and 8B may be formed by curving around an axis parallel to the x-axis and then rotating around the y-axis. It may be said that the bandpass filter is curved in the y-direction and inclined in the x-direction. The bandpass filter 800 disperses sunlight light in the y-z plane, as shown by light rays 803 in FIG. 8B, and directs the sunlight away from the first mirror 421 in the x-z plane, as shown by the light rays 803 in FIG. 8A. In another embodiment, the bandpass filter 800 of FIG. 8A is also curved in cross-section. This additional curvature may be such that the surface of the bandpass filter is not normal to the optical path at any point on the surface of the bandpass filter. In other words, this additional curvature may be such that all tangents to the surface of the bandpass filter are non-normal to the optical path.

In examples, the bandpass filter is parallel-faced. That is, the first surface is parallel to the second surface. In other words, the two largest surfaces (greatest surface area) of the bandpass filter are substantially parallel. A parallel-faced bandpass filter may be formed by bending a flat plate in one-direction. In other examples, only one of the surfaces is curved and the other surface is planar. For example, the first surface may be convex and the second surface may be planar. For example, the second surface may be concave and the first surface may be planar. In examples, the bandpass filter has a conical shape with sides that taper inwardly towards the screen in order to minimise the surface area of the filter.

Additional Features

Embodiments refer to an electrically-activated LCOS spatial light modulator by way of example only. The teachings of the present disclosure may equally be implemented on any spatial light modulator capable of displaying a computer-generated hologram in accordance with the present disclosure such as any electrically-activated SLMs, optically-activated SLM, digital micromirror device or microelectromechanical device, for example.

In some embodiments, the light source is a laser such as a laser diode. There is described herein a screen but the screen may be any light-receiving surface or display surface. The light-receiving surface may be a diffuse surface such as a diffuser.

Examples describe illuminating the SLM with visible light but the skilled person will understand that the light sources and SLM may equally be used to direct infrared or ultraviolet light, for example, as disclosed herein. For example, the skilled person will be aware of techniques for converting infrared and ultraviolet light into visible light for the purpose of providing the information to a user. For example, the present disclosure extends to using phosphors and/or quantum dot technology for this purpose.

The methods and processes described herein may be embodied on a computer-readable medium. The term "computer-readable medium" includes a medium arranged to store data temporarily or permanently such as random-access memory (RAM), read-only memory (ROM), buffer memory, flash memory, and cache memory. The term "computer-readable medium" shall also be taken to include any medium, or combination of multiple media, that is capable of storing instructions for execution by a machine such that the instructions, when executed by one or more processors, cause the machine to perform any one or more of the methodologies described herein, in whole or in part.

The term "computer-readable medium" also encompasses cloud-based storage systems. The term "computer-readable medium" includes, but is not limited to, one or more tangible and non-transitory data repositories (e.g., data volumes) in the example form of a solid-state memory chip, an optical disc, a magnetic disc, or any suitable combination thereof. In some example embodiments, the instructions for execution may be communicated by a carrier medium. Examples of such a carrier medium include a transient medium (e.g., a propagating signal that communicates instructions).

It will be apparent to those skilled in the art that various modifications and variations can be made without departing from the scope of the appended claims. The present disclosure covers all modifications and variations within the scope of the appended claims and their equivalents.

The invention claimed is:

1. A head-up display for a vehicle, wherein the head-up display comprises:
    a picture generating unit arranged to display a picture, wherein the picture generating unit comprises a spatial light modulator arranged to spatially-modulate light in accordance with a computer-generated hologram displayed thereon to form a holographic reconstruction corresponding to the picture on a screen;
    an optical system arranged to receive light of the picture, wherein the optical system comprises at least one reflective element having optical power arranged to form a magnified image of the picture; and
    a bandpass filter which is transmissive to light of the picture and reflective to light of other wavelengths, wherein the bandpass filter is disposed between the optical system and the screen and curved having a convex surface arranged to receive light from the optical system and a concave surface arranged to receive light of the picture from the screen,
    wherein the bandpass filter is cylindrically curved around an axis which is tilted with respect to the screen, and has sides tapered inwardly towards the screen, in correspondence with the shape of the light cone of the light propagating from the optical system towards the picture generating unit.

2. A head-up display as claimed in claim 1 wherein the normal to the screen is parallel to the input optical axis of the optical system.

3. A head-up display as claimed in claim 1 wherein the light received by the bandpass filter from the optical system is sunlight.

4. A head-up display as claimed in claim 3, wherein the sunlight is direct sunlight or ambient sunlight.

5. A head-up display as claimed in claim 1 further comprising a beam dump arranged to receive light reflected by the convex surface of the bandpass filter.

6. A head-up display as claimed in claim 1 wherein the picture generating unit further comprises a laser arranged to emit narrowband light having a centre wavelength corresponding to a transmission band of the bandpass filter.

7. A head-up display as claimed in claim 1 wherein the light of the picture comprises narrowband red, green and blue light and the bandpass filter comprises three narrowband transmission notches corresponding to the red, green and blue light.

8. A head-up display as claimed in claim 1 wherein the at least one reflective element is positioned within its focal length of the screen such that the magnified image of the picture is a virtual image.

9. A head-up display as claimed in claim 1, further comprising a beam dump arranged to receive light reflected by the convex surface of the bandpass filter, and wherein the bandpass filter is curved around an axis which is tilted with respect to the screen, the light received by the bandpass filter from the optical system is sunlight, and the picture generating unit further comprises a laser arranged to emit narrowband light having a centre wavelength corresponding to a transmission band of the bandpass filter.

10. A head-up display as claimed in claim 9 wherein the light of the picture comprises narrowband red, green and blue light and the bandpass filter comprises three narrowband transmission notches corresponding to the red, green and blue light.

11. A head-up display system comprising a head-up display as claimed in claim 1 and an optical combiner arranged to receive the magnified image of the picture from the head-up display and reflect the magnified image to a viewing plane.

12. A vehicle comprising a head-up display as claimed in claim 1 and a windscreen arranged to receive the magnified image of the picture from the head-up display and reflect the magnified image to an eye-box within the vehicle.

13. A method of improving image quality in a head-up display, the method comprising:

displaying a computer-generated hologram on a spatial light modulator;

spatially-modulating light in accordance with the computer-generated hologram to form a holographic reconstruction corresponding to the picture on a screen;

transmitting light of the picture through a bandpass filter to an optical system;

forming a magnified image of the picture using at least one reflective element of the optical system having optical power; and reflecting light of other wavelengths received from the optical system using the bandpass filter, wherein the bandpass filter is cylindrically curved around an axis tilted with respect to the screen to form a convex surface receiving light from the optical system and a concave surface receiving light of the picture from the screen, and wherein the bandpass filter has sides tapered inwardly towards the screen, in correspondence with the shape of the light cone of the light propagating from the optical system towards the picture generating unit.

14. A method as claimed in claim 13 wherein the light of other wavelengths received by the bandpass filter from the optical system is converging owing to the optical power of the at least one reflective element.

15. A method as claimed in claim 13 wherein the light of the picture transmitted by the bandpass filter is diverging.

* * * * *